United States Patent [19]

Hudson et al.

[11] Patent Number: 4,791,785
[45] Date of Patent: Dec. 20, 1988

[54] REMOVAL OF PARTICULATE MATERIAL FROM A GAS

[75] Inventors: John C. Hudson; Shok Thantrey; Ian M. Jackson, all of Boston, England

[73] Assignee: Porous Element Heating Limited, Lincolnshire, England

[21] Appl. No.: 20,087

[22] Filed: Feb. 27, 1987

[30] Foreign Application Priority Data

Feb. 28, 1986 [GB] United Kingdom ............... 8605058

[51] Int. Cl.[4] .............................................. F01N 3/02
[52] U.S. Cl. ........................................ 60/303; 55/466; 55/523; 55/DIG. 30; 60/311
[58] Field of Search ............... 60/274, 286, 303, 311; 55/466, 484, 523, DIG. 30

[56] References Cited

U.S. PATENT DOCUMENTS

| | | |
|---|---|---|
| 4,281,512 | 8/1981 | Mills . |
| 4,345,431 | 8/1982 | Suzuki ................................ 60/286 |
| 4,404,795 | 9/1983 | Oishi ................................... 60/303 |
| 4,485,621 | 12/1984 | Wong .................................. 60/274 |
| 4,535,589 | 8/1985 | Yoshida .............................. 60/303 |
| 4,558,565 | 12/1985 | Kojima et al. . |

FOREIGN PATENT DOCUMENTS

| | | |
|---|---|---|
| 145941 | 1/1981 | German Democratic Rep. ... 60/295 |
| 58-122016 | 7/1983 | Japan . |
| 180715 | 10/1983 | Japan ................................. 60/303 |
| 59-28012 | 2/1984 | Japan . |
| 59-39782 | 3/1984 | Japan . |
| 60-212610 | 10/1984 | Japan . |

Primary Examiner—Douglas Hart
Attorney, Agent, or Firm—Watson, Cole, Grindle & Watson

[57] ABSTRACT

Filtering apparatus for removing combustible particles from a gas, e.g. carbon and hydrocarbon particles from the exhaust gases of a diesel engine, comprises at least one filter element which is made of fibrous material and is electrically conductive. To remove trapped particles from the filter element and thereby regenerate the filter element, electrical power is supplied to the filter element to heat it to the point at which the carbon and hydrocarbon particles combust. One or a plurality of such filter elements may be provided in a housing in the exhaust gas system of a diesel engine with the filter elements exposed in parallel to exhaust gases. For regeneration, all filter elements may be simultaneously regenerated while exhaust gases are either exhausted direct to the air or through a similar filtering apparatus. Alternatively the filter elements may be regenerated sequentially so that at least some of the filter elements are always effective as filters. During regeneration exhaust gases are substantially excluded from a filter element undergoing regeneration and this may be effected by preventing flow of the exhaust gases to the filter element while it is being regenerated or by increasing the pressure downstream of the filter element to prevent exhaust flowing through the filter element. Each filter element is preferably annular and arranged so that exhaust gases flow through the wall in a radially inward direction.

43 Claims, 4 Drawing Sheets

REMOVAL OF PARTICULATE MATERIAL FROM A GAS

BACKGROUND OF THE INVENTION

The present invention relates to apparatus for the removal of particulate material from a gas, particularly combustible particulate material, for example carbon and hydrocarbon particles from the exhaust gas of a diesel engine.

There is increasing interest in the efficient and effective limitation of emission of particulate material, generally carbon and hydrocarbon particles, from the exhaust gases of diesel engines and devices have been proposed for this purpose which generally comprise a filter mounted in the diesel engine exhaust system and in which the carbon particles are trapped. However, presently proposed filters become blocked very rapidly so that it is necessary to intermittently remove the carbon particles from the filter during operation of the diesel engine. It has been proposed to effect this by intermittently heating up gases entering the filter to a temperature at which the carbon particles will combust, generally by providing a heat source upstream of the filter which is activated intermittently.

SUMMARY OF THE INVENTION

According to the present invention, there is provided apparatus for removing combustible particles from a first gas comprising a housing through which the first gas is caused to flow and having an inlet for gas and an outlet and, mounted within said housing, a filter element through which in use the first gas will flow and which is made of electrically conductive material, and means for connecting the element to an electrical power supply for heating the element to a temperature at which the particles trapped thereby will combust for regeneration of the element.

It will be appreciated that the electrical resistance of the material of the filter element is selected relative to the power supply to enable the filter element to be heated to the required temperature for combustion of the combustible particles.

In use, when it is required to remove the trapped particles from the filter element, power is supplies to the filter element to heat it to the required temperature. With such an arrangement, because the combustible particles are heated directly by the filter element, rather than as previously proposed indirectly by heating gas flowing through the filter, less power is required to cause combustion of the particles.

Preferably means are provided for substantially reducing the flow of the first gas through the filter element when it is connected to the power supply to minimise cooling of the element by the first gases and therefore minimise losses of thermal energy from the element. A small flow of gas, which may be the first gas or an auxiliary combustion supporting gas, is required but only to provide sufficient oxygen to support combustion.

The filter element may be annular and closed at one end, the filter element being arranged in the housing so that the first gas flows substantially radially inwardly to the interior of the element and out of the open end. With such a filter element, combustion supporting gas may be supplied from the open end to the interior of the element at a sufficient pressure that it prevents or substantially prevents flow of exhaust gases through the filter element.

The apparatus may comprise a plurality of filter elements arranged in parallel for simultaneous exposure to the first gas to be filtered thereby and the means for connecting the elements to an electrical power supply may be arranged so that all the elements are connected simultaneously for simultaneous regeneration or so that the elements are connected sequentially for sequential regeneration.

The present invention will be more fully understood from the following description of embodiments thereof, given by way of example only, with reference to the accompanying drawings.

DETAILED DESCRIPTION OF THE PREFERRED EMBODIMENTS

Figure 1:
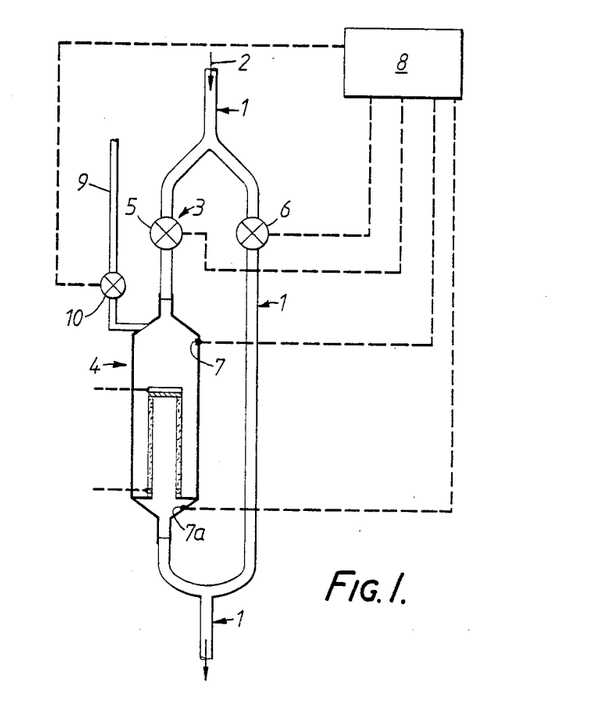
FIG. 1 is a diagrammatic representation of part of a diesel engine exhaust system including an embodiment of apparatus according to the present invention.

In FIG. 1 there is shown an exhaust pipe 1 of a diesel engine through which exhaust gases flow in the direction of arrow 2. Conventionally such exhaust gases would flow from the pipe 1 to the atmosphere, optionally through a muffler (not shown). As shown in FIG. 1, the exhaust pipe 1 is provided with a branch pipe 3 including filtering apparatus 4 for removing particles, which are generally carbon and hydrocarbon particles, in the exhaust gases. Branch pipe 3 is provided, upstream of apparatus 4, with a valve 5 and a valve 6 is also provided in exhaust pipe 1 downstream of its connection with branch pipe 3. In operation, these valves are alternatively opened and closed to permit the exhaust gases from the engine to flow either through exhaust pipe 1 or through exhaust pipe 3 and apparatus 4 as will be described hereafter.

It will be appreciated that valve 5 may alternatively be positioned in branch pipe 3 downstream of apparatus 4 rather than as shown upstream. Additionally valves 5 and 6 may be combined in the form of a multiposition valve positioned at either the upstream or the downstream junction between pipes 1 and 3.

Figure 2:
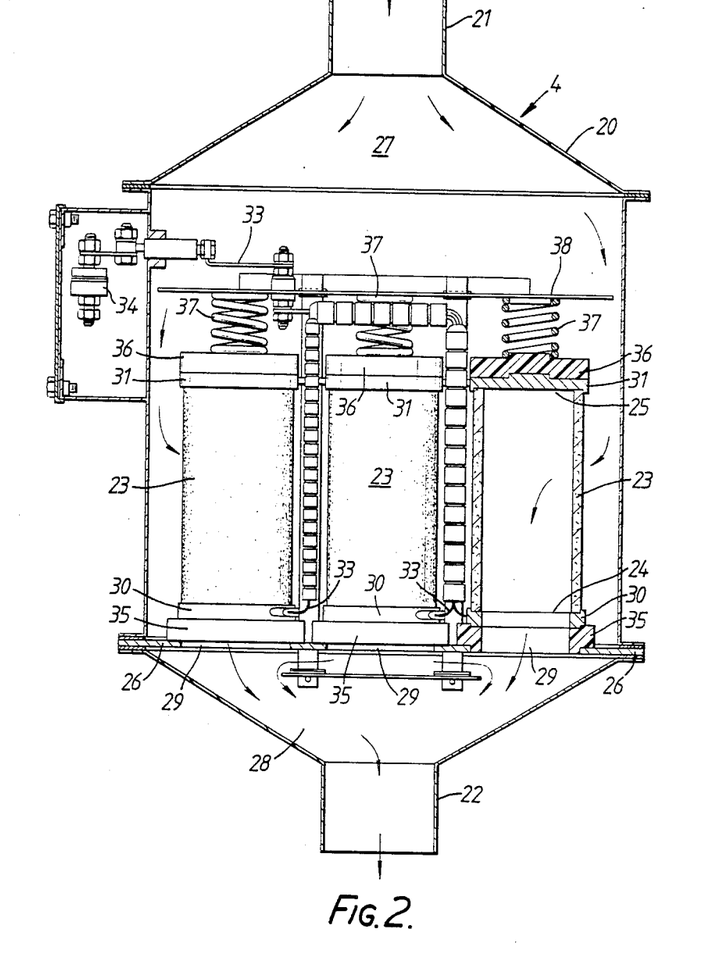
FIG. 2 is a section through the embodiment according to the present invention as shown in FIG. 1.

Apparatus 4, shown in more detail in FIG. 2, includes one or a plurality of filter elements through which the exhaust gases flow and which trap particles therein. During operation of the diesel engine, initially valve 6 is closed and valve 5 is opened so that the exhaust gases flow through branch pipe 3 and apparatus 4. Flow through apparatus 4 continues until the or each filter element becomes partially clogged with particles. This may be detected, as shown, by the consequential increase in the pressure in the inlet of apparatus 4 which may, for example, be sensed by a pressure detector 7.

When the pressure detected by detector 7 reaches a predetermined level, valve 5 is closed and valve 6 is opened to permit the exhaust gases to flow through the main exhaust pipe 1 to the atmosphere. Closing and opening of valves 5 and 6 is effected automatically by control means 8, to which the output of the pressure detector 7 is supplied.

The or each filter element in apparatus 4 is made of electrically conductive material which has an electrical resistance such that it itself serves as a heater for heating up the carbon or hydrocarbon particles trapped therein to a temperature at which they will combust. The or each filter element is connected by switch means, to be described hereafter, to a power supply, which may for example be the engine battery or alternator, the switch means being under the control of control means 8 so that, on closing of valve 5, the switch means is operated to supply power to the or each filter element to heat it to the combustion point of the carbon or hydrocarbon particles for regeneration of the filter element. For combustion, a small supply of oxygen is required sufficient to support combustion and this may be provided by only partially closing valve 5 when it is in its "closed" position so as to permit some exhaust gases to flow sufficient to support combustion. Alternatively an auxiliary combustion supporting gas, e.g. air, may be supplied to the or each filter element. As shown in FIG. 1, air is supplied to the inlet of apparatus 4 via a pipe 9 provided with a valve 10 which is opened as valve 5 is closed (and closed with opening of valve 5) under the control of control means 8. The supply of air for pipe 9 may for example be taken from the vehicle compressor or any other suitable source of air or oxygen.

As soon as all or substantially all of the carbon and hydrocarbon particles in the or each filter have been burnt away, which may be indicated by a change in the pressure downstream of the element or elements and detected by a second pressure detector 7a, valve 10 is closed, valve 5 is reopened and valve 6 is closed by control means 8 so that the exhaust gases are again diverted through branch pipe 3 and filtering apparatus 4. In a modification, the auxiliary combustion supporting gas may be supplied to the outlet of apparatus 4 and caused to flow through the or each filter element in the opposite direction to the direction of flow of the exhaust gases.

In a modification of the above described system whereby all exhaust gases from the diesel engine are filtered, filtering apparatus corresponding to apparatus 4 may also be provided in the main exhaust pipe 1, the two apparatus being regenerated alternately.

Furthermore, as an alternative to the use and provision of a pressure detector 7 to initiate and termination regeneration of the filters and operation of valves 5, 6 and 10, control means 8 may include a timing system which is used to control the valves and initiate and terminate regeneration. With such a system, the or each filter element is regenerated for a predetermined period of time in each set period of time in which the diesel engine is running, the periods being determined in dependence on the particular circumstances of use to ensure that the or each filter element is adequately regenerated and regenerated before it becomes too clogged with particles.

The filtering apparatus 4 shown in FIG. 1 is shown in greater detail in FIG. 2. It comprises a housing 20 having an inlet 21 and an outlet 22 for connection in the exhaust branch pipe 3. Within the housing 2 a plurality of filter elements 23, as shown three elements, are provided which elements are arranged in effect in parallel for simultaneous flow of exhaust gases therethrough. The filter elements are cylindrical and have annular walls, the interior of each element being open at one end 24 and closed at the other end 25.

A plate 26 adjacent the outlet 22 of the housing spans the housing and divides it into an inlet manifold or chamber 27 between plate 26 and inlet 21 and an outlet manifold or chamber 28 between plate 26 and outlet 22. The filter elements 23 extend within manifold 27 and the plate 26 is provided with apertures 29 which are aligned with the open ends 24 of the filter elements 23 and through which the outlet manifold 28 communicates with the interiors of the filter elements, whose closed ends 25 are presented to inlet manifold 27.

In use, exhaust gases entering inlet 21 flow into manifold 27 and around the outsides of the filter elements 23, then substantially radially through the walls of the filter elements 23 into the interiors, then through apertures 29 and into the outlet manifold 28.

For connection of an electric power supply to the filter elements 23, each end 24,25 is provided with a contact plate 30,31. Contact plate 30 is annular and contact plate 31 also forms a closure for closing the end 25 of the element. The contact plates 30,31 are connected to insulated wires 33 which are connected to terminals 34 mounted externally on the housing 20.

The filter elements 23 and their contact plates 30,31 are insulated from the housing by insulators 35,36. Insulator 35, which is annular, is shaped to positively engage with contact plate 30 and to seat in the respective opening 29 in plate 26. Insulator 36 which is in the form of a plate is also shaped to make positive engagement with contact plate 31. Each of the assemblies of filter element 23, contact plates 30,31 and insulators 35, 36 is positively biased into engagement with each other and with the plate 26 by a helical spring 37 acting between insulator plate 36 and a bracket 38 mounted on and within the housing 20.

Figure 3:
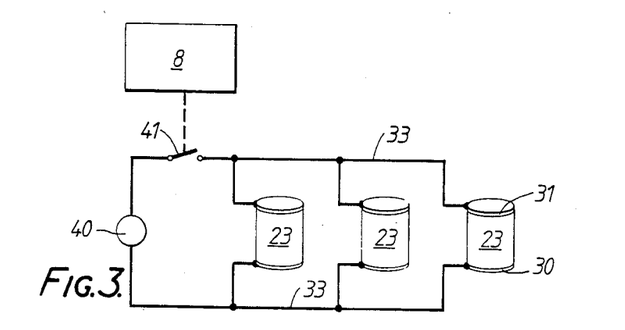
FIG. 3 shows diagrammatically circuitry associated with the apparatus of FIGS. 1 and 2.

The elements 23 are, as shown in FIG. 3, connected in parallel across a suitable power supply 40, for example in the engine battery or alternator, and the circuit includes a switch 41 which is opened and closed by the control means 8 as described above. Alternatively the elements 23 may be connected in series with switch 41 and power supply 40.

While as described above, three filter elements 23 are provided, it will be appreciated that the apparatus 4 may comprise one, two or more than three filter elements 23, the number of filter elements provided depending on the exhaust emissions and on the size and efficiency of the or each element 23.

Figure 4:
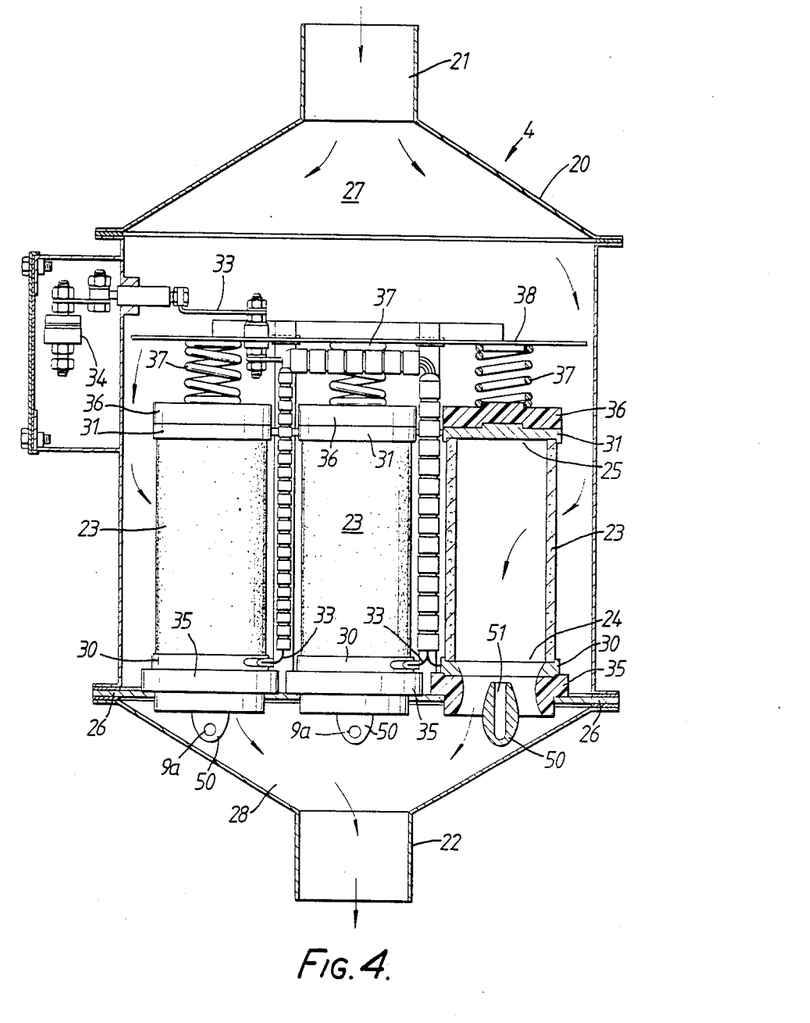
FIG. 4 is a section through another embodiment of apparatus according to the present invention.
Figure 5:
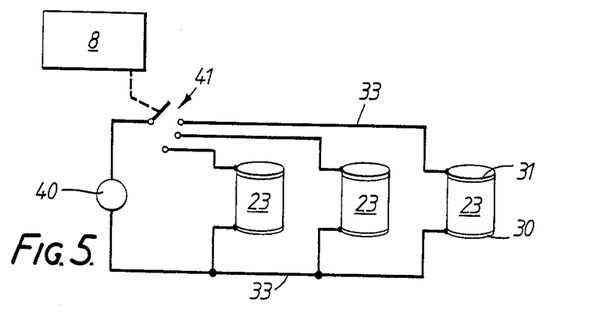
FIG. 5 shows diagrammatically circuitry associated with the apparatus of FIG. 4.
Figure 6:
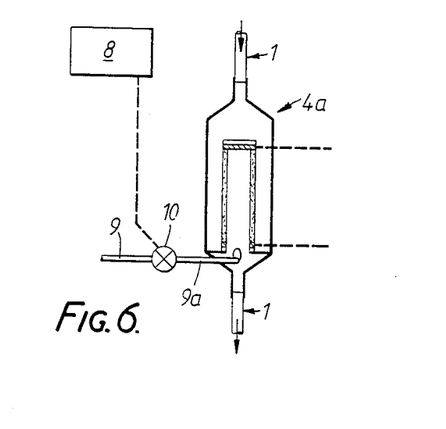
FIG. 6 is a diagrammatic representation of part of a diesel engine exhaust system incorporating the embodiment of FIG. 4.

The filtering apparatus 4 shown in FIGS. 1 to 3 may be modified, as shown in FIGS. 4, 5 and 6 to enable all exhaust gases to be passed through it. With this modification, which will be described hereafter, the modified filtering apparatus 4a can, as shown in FIG. 6, be connected directly in the exhaust pipe 1 of the diesel engine, bypass 3 and valves 5,6 being omitted. As will be described hereafter, the apparatus 4a includes a plurality of filter elements and a combustion supporting gas supply is required for each element. The apparatus shown in FIG. 6 thus comprises supply pipe 9, as in the apparatus of FIG. 1, which is provided with a valve 10 but in this case valve 10 is a multi-position valve having a closed position and positions supplying gas to each of the individual supply pipes 9a for each filter element. As in the previous embodiment, valve 10 is controlled by control means 8 which, in this embodiment, includes a timer for operating valve 10 and initiating and terminationing regeneration of the filter elements, as will be described hereafter.

The apparatus as shown in detail in FIG. 4 is similar to that of FIG. 2 and like reference numerals are used for like parts, which will not be further described. The primary differences between the apparatus shown in FIG. 4 and that shown in FIG. 2 are the electrical connection of the filter elements 23, which is most clearly shown in FIG. 6, and the configuration of components at the open outlet end 24 in relation to the supply of combustion supporting gas. In relation to the latter, the combustion supporting gas is supplied to each filter element 23 in a direction counter-current to the direction of flow of exhaust gases therethrough and the arrangement is such that supply of the combustion supporting gas to a filter element will effectively prevent flow of exhaust gases through the walls thereof. Thus by this arrangement the supply of combustion supporting gas to a filter element effectively serves the function of a valve or other means substantially preventing supply of exhaust gases thereto while regeneration is taking place.

More specifically, as shown in FIG. 4, the inner periphery of the opening in contact plate 30 and insulator 35 at the open end 24 of each filter element 23 is shaped to provide in this region a restriction in the flow cross section for exhaust gases. As shown, in this region the flow cross section progressively decreases and then progressively increases, insulator 35 having been axially extended relative to that of FIG. 2. Additionally, the outlet end portion 50 of each pipe 9a providing combustion supporting gas to a respective filter element 23 has a generally bullet-shaped configuration, the axis of the bullet being aligned with the axis of the filter element and the outlet 51 for gas is directed along the axis of the element counter-current to the direction of flow of exhaust gases.

The filter elements 23 are designed so that two out of the three elements are sufficient to filter exhaust gases generated by the diesel engine at any one time and the period for regeneration of any one filter element is one third, or less than one third, of the time between each regeneration of a filter.

As regards the connection of the filter elements 23 to the power supply, as shown in FIG. 5 they are individually connectable through a multi-position switch 41, under the control of control means 8, to the power supply 40, operation of switch 41 being synchronised with operation of valve 10 as will be described hereafter.

With the above described apparatus in use, at the point when a filter element 23 requires regeneration, valve 10 is moved to the position supplying combustion supporting gas to be related pipe 9a and at the same time switch 41 is moved to the position connecting the filter element to the power supply. Supply of the combustion supporting gas to the interior of the element has, as described above, the effect of substantially preventing flow of further exhaust gases through the element which then heats up to the point at which particles trapped thereby combust. Since combustion is exothermic, the supply of power to the filter element may be cut off before combustion is complete, at the point at which combustion provides sufficient heat to be self supporting but the supply of combustion supporting gas is continued up to the end of the regeneration period. At that point valve 10 is moved to its closed position and the element resumes operation as a filtering element. The control means 8 operates so that the filter elements 23 are regenerated sequentially so that at any one time at least two of the elements are operating as filter elements while the third may be subject to regeneration. As previously mentioned, for convenience, the regeneration of the elements is controlled by a timer. It could alternatively be controlled by relative pressures as in the embodiment of FIGS. 1 to 3 but this would increase the cost of the apparatus.

At the end of a period of use of the engine, when the engine is switched off the timer associated with control means 8 is also switched off and then re-started when the engine is re-started to ensure that sequential regeneration of the filter elements is maintained throughout the period of installation of filter apparatus in the exhaust system of the engine.

Figure 7:
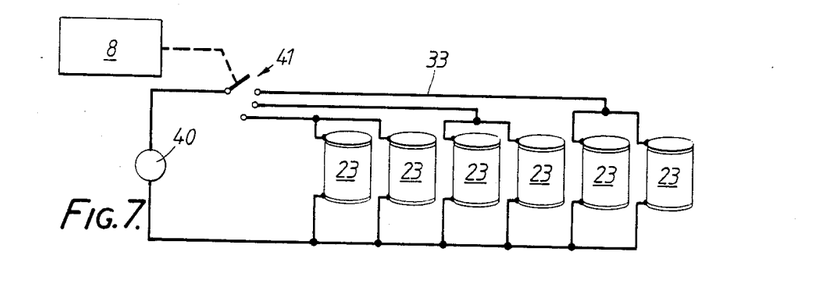
FIG. 7 shows diagrammatically circuitry associated with a modification of the apparatus of FIG. 4.

It will be appreciated that, with larger filter elements or reduced exhaust, only two filter elements may be provided, the elements being regenerated alternately. With smaller filter elements or to deal with larger quantities of exhaust, a greater number of filter elements may be provided. Where the regeneration time of any one filter element is in excess of the period of time between successive regenerations of any one filter element divided by the number of filter elements, the elements may then be electrically connected in groups with groups of elements being regenerated successively. The electrical circuitry for such an arrangement is shown diagrammatically in FIG. 7 in which each group of filter elements comprises two filter elements and the filtering apparatus comprises three groups in total.

In a modification of the above described apparatus, an exhaust gas by-pass for apparatus 4 may be provided in effect as in the embodiment of FIG. 1 with individual or a multiposition valve for controlling flow of exhaust gases either through the apparatus 4 or through the by-pass. However in this modification, the valves or multiposition valve are operated by the control means 8 under the control of a pressure detector sensing pressure within apparatus 4 either upstream or downstream of the filter elements with a view to bypassing the apparatus 4 only in the event of a malfunction of the apparatus 4. A malfunction resulting from insufficient regeneration of the filter elements would be indicated by an increase in pressure upstream of the elements or a decrease in pressure downstream of the elements above or below respectively preset pressures.

The above described filter elements 23 are made of randomly arranged fibres of silicon carbide which provided tortuous paths for gases therethrough. Preferably the silicon carbide fibres are hollow. Such a filter element may be made from a carbon fibre precursor which may for example be made in accordance with U.K. Pat. No. 1600253 from a fibrous element made in accordance with U.K. Pat. No. 1503644. The fibrous material of the initial fibrous element may for example have a bulk density of 70 to 100 kg/m$^3$. Such a carbon fibre element is heated in a furnace to a temperature of the order of 680° C. The furnace is evacuated and an inert gas, for example argon, is introduced together with a reactant gas comprising 60% silane and 40% ethylene with a dopant comprising 1% phosphine in argon. Silicon carbide is thus deposited onto the carbon fibre element to provide a coating of silicon carbide, for example of the order of 8 microns thick, over the carbon fibres. The coated element is then heated to a temperature of about 800° C. to oxidise and thereby remove the carbon fibres to leave hollow silicon carbide fibres. The silicon carbide element is then subject to further heat treatment, for example by heating the element in an inert atmosphere, for example of argon, at a temperature of about 1,350° C. to provide the element with the required resistivity.

The resulting element is then machined to provide a filter element of the required dimensions and the ends of the filter element are treated, for example by flame spraying, e.g., with stainless steel or Nichrome powder or wire, in order to reduce the contact resistance at the ends of the filter element between the fibres of the filter element and the contact plates 30,31.

The resulting filter element, if annular, may have an outside diameter of 60 mm, an inside diameter of 52 mm and may be 120 mm long. Advantageously the resistance is of the order of 0.2 to 2.0 ohms, the resistance selected depending on the voltage of the power supply to be connected to it.

A filter element as described above, is found to present a relatively small resistance to flow of gases, for example to create a backpressure of the order of or less than 10 ins water and has a high trapping efficiency of the order of 60–80%. As with known systems, it is considered that, when the backpressure across a filter element partially clogged with particles reaches about 30 ins water, the filter element requires regeneration.

Because the filter is itself heated to initiate combustion of the carbon or hydrocarbon particles, the power required and the duration of the supply of power for regeneration can be significantly reduced as compared with known filtering apparatus.

The filter element may include a catalyst for reducing the combustion temperature, normally 600° C. to 625° C., at which the carbon particles combust. The catalyst may be applied to the surface of the fibres or incorporated in the fibres of the element. The catalyst may, for example, comprise a coating on the fibres of alumina or silica or a mixture of alumina and silica which may be applied by a washcoating or similar technique.

What is claimed is:

1. Apparatus for removing combustible particles from a first gas comprising:
   a housing having an inlet for the first gas and an outlet;
   a filter element mounted within the housing for trapping the particles in the first gas as it flows through the housing, said filter element being generally cylindrical and having an annular wall through which in use the first gas will flow substantially radially from the exterior thereof to the interior thereof, means closing one end of said element, the other end of said element being open to permit the first gas to flow from the interior thereof to the outlet of the housing, said element being made of electrically-conductive material;
   means for connecting said element to an electrical power supply for heating said element to a temperature at which the particles trapped thereby will combust for regeneration of said element;
   auxiliary gas supply means for supplying an auxiliary combustion-supporting gas to the interior of said element when said element is connected to said electrical power supply, said auxiliary gas supply means comprising an outlet end portion arranged in the region of said open end of said element for directing said auxiliary gas into the interior of said element; and
   wherein, in the region of said open end of said element, the flow path for gas therefrom is shaped relative to said outlet portion of said auxiliary gas supply means so that supply of the auxiliary gas to the interior of said element will substantially prevent flow of said first gas through said element.

2. Apparatus as claimed in claim 1, wherein a plurality of said filter elements are mounted in said housing for simultaneous flow of gas therethrough.

3. Apparatus as claimed in claim 2, wherein said means for connecting said elements to an electrical power supply comprise means connecting said elements in parallel and switch means for connecting said elements simultaneously to a power supply.

4. Apparatus as claimed in claim 2, wherein said means for connecting said elements to an electrical power supply comprise switch means for connecting said elements sequentially to a power supply.

5. Apparatus as claimed in claim 1, wherein the element is made of randomly arranged fibres of electrically conductive material.

6. Apparatus as claimed in claim 5, wherein said fibres comprise silicon carbide.

7. Apparatus as claimed in claim 1, wherein the element is made of randomly arranged hollow fibres of silicon carbide.

8. Apparatus as claimed in claim 7, wherein the fibres are coated with one of alumina, silica and a mixture of alumina and silica.

9. Apparatus as claimed in claim 7, wherein the element includes a catalyst for reducing the combustion temperature of the combustible particles.

10. Apparatus as claimed in claim 5, wherein said fibres are hollow.

11. Apparatus for removing combustible particles from a first gas comprising:
    a housing having an inlet for the first gas and an outlet;
    a plurality of filter elements for trapping the combustible particles in the first gas, said elements being mounted within said housing for flow of the first gas simultaneously therethrough, each said filter element being generally cylindrical and having an annular wall through which in use the first gas will flow substantially radially from the exterior thereof to the interior thereof, means closing one end of each element, the other end being open to permit the first gas to flow therethrough to the outlet of said housing, each said element being made of electrically-conductive material;
    means for connecting each said element to an electrical power supply for heating the said element to a temperature at which the particles trapped thereby will combust for regeneration of said element;
    means for supplying an auxiliary combustion-supporting gas to the interior of each said element when the respective said element is connected to said electrical power supply, each said auxiliary gas supply means being arranged relative to the respective element so that supply of the auxiliary gas to a respective said element will substantially prevent the first gas flowing therethrough; and
    control means for sequentially connecting one of said elements of said elements to the electrical power supply and for supplying the auxiliary gas thereto for sequentially regenerating said elements.

12. Apparatus as claimed in claim 11, wherein in the region of said open end of each said element, the flow path for gas therefrom is shaped relative to said outlet portion of said auxiliary gas supply means so that supply of auxiliary gas to the interior of said element substantially prevents flow of said first gas through each said element.

13. Apparatus as claimed in claim 1, wherein in the region of said open end of said element, said flow path for gas therefrom is reduced relative to the flow path in said interior of said element, said reduction being progressive in the direction of flow of said first gas from said element and said flow path progressively widening downstream of said reduction.

14. Apparatus as claimed in claim 13, wherein said outlet portion of said auxiliary gas supply means is arranged substantially centrally in said region of said open end of said element to direct the auxiliary gas axially into the interior of said element and has a generally bullet-shaped exterior profile.

15. Apparatus as claimed in claim 12, wherein a plurality of said elements are mounted in said housing for simultaneous flow of gas therethrough.

16. Apparatus as claimed in claim 15, wherein said housing is provided with a wall separating the interior thereof into an inlet chamber and an outlet chamber, said filter elements being mounted on said wall with their open ends aligned with openings in said wall and extending within said inlet chamber.

17. Apparatus as claimed in claim 15, wherein said means for connecting said elements to an electrical power supply comprise switch means for connecting said elements sequentially to an electrical power supply.

18. Apparatus as claimed in claim 15, wherein said means for connecting said elements to an electrical power supply comprise means for connecting said elements in parallel in groups thereof and switch means for connecting each group of elements sequentially to an electrical power supply.

19. Apparatus as claimed in claim 11, wherein in the region of said open end of each said filter element said flow path for gas therefrom is reduced relative to the flow path in said interior thereof, said reduction being progressive in the direction of flow of said first gas from the respective filter element and said flow path progressively widening downstream of said reduction.

20. Apparatus as claimed in claim 19, wherein said outlet portions of said auxiliary gas supply means are arranged substantially centrally in said region of said open end of a respective filter element to direct the auxiliary gas axially into the interior of the respective filter element and has a generally bullet-shaped exterior profile.

21. Apparatus as claimed in claim 11, wherein said housing is provided with a wall separating the interior thereof into an inlet chamber and an outlet chamber, said filter elements being mounted on said wall with their open ends aligned with openings in said wall and extending within said inlet chamber.

22. Apparatus as claimed in claim 11, wherein said means for connecting said filter elements to an electrical power supply comprise switch means for connecting said filter elements sequentially to an electrical power supply.

23. Apparatus as claimed in claim 11, wherein said means for connecting said filter elements to an electrical power supply comprise means for connecting said filter elements in parallel in groups thereof and switch means for connecting each group of filter elements sequentially to an electrical power supply.

24. Apparatus as claimed in claim 11, wherein each said filter element is made of randomly arranged fibres of electrically conductive material.

25. Apparatus as claimed in claim 24, wherein said fibres comprise silicon carbide.

26. Apparatus as claimed in claim 11, wherein each said filter element is made of randomly arranged hollow fibres of silicon carbide.

27. Apparatus as claimed in claim 26, wherein the silicon carbide fibres are coated with one of alumina, silica and a mixture of alumina and silica.

28. Apparatus as claimed in claim 26, wherein each said filter element includes a catalyst for reducing the combustion temperature of the combustible particles.

29. Apparatus as claimed in claim 24, wherein said fibres are hollow.

30. Apparatus for removing combustible particles from a first gas comprising:
a housing having an inlet for the first gas and an outlet;
a plurality of filter elements for trapping combustible particles in the first gas, said elements being mounted in said housing for flow of the first gas simultaneously therethrough, each said filter element being made of electrically-conductive material; and
means for connecting each said element to an electrical power supply for heating each said element to a temperature at which the particles trapped thereby will combust for regeneration of said element and comprising means for connecting said elements in parallel in groups thereof and switch means for connecting each group of elements sequentially to an electrical power supply.

31. Apparatus as claimed in claim 30, comprising means for supplying an auxiliary combustion gas to said housing when said filter elements are connected to the electrical power supply, said auxiliary gas supply means being arranged so that said supply of said auxiliary gas thereby will substantially prevent the first gas flowing through said filter elements to thereby provide said means for at least substantially reducing the flow of first gas through said filter elements.

32. Apparatus as claimed in claim 30, wherein each said filter element is generally cylindrical and comprises an annular wall and is arranged in said housing so that the first gas will flow substantially radially inwardly through said wall thereof.

33. Apparatus as claimed in claim 32, including means closing one end of each said filter element, the other end of each said filter element being open to permit the first gas to flow from the interior thereof to the outlet of said housing, and wherein said auxiliary gas supply means comprises outlet portions which are arranged in the region of said open end of a respective filter element for directing auxiliary gas into the interior of the respective filter element.

34. Apparatus for removing combustible particles from a first gas comprising:
a housing having an inlet for the first gas and an outlet;
a plurality of filter elements for trapping combustible particles in the first gas, said elements being mounted in said housing for flow of the first gas simultaneously therethrough, each said element being made of electrically-conductive material; and means for connecting each said element to an electrical power supply for heating said element to a temperature at which the particles trapped thereby will combust for regeneration of said element and comprising means for connecting said elements in parallel and switch means for connecting said elements simultaneously to a power supply.

35. Apparatus as claimed in claim 34, including means for at least substantially reducing the flow of the first gas through said elements when connected to the electrical power supply.

36. Apparatus as claimed in claim 35, wherein said means for substantially reducing flow of the first gas through said element comprises a valve connected to said inlet of said housing for controlling flow of gas to said inlet.

37. Apparatus as claimed in claim 36, wherein said valve is arranged so that in the closed condition thereof a reduced flow of gas enters said housing for providing sufficient oxygen to support combustion.

38. Apparatus as claimed in claim 35 comprising means for supplying an auxiliary combustion supporting gas to said housing when said elements are connected to the electrical power supply.

39. Apparatus as claimed in claim 38 including control means for controlling said means for substantially reducing the flow of first gas through said elements and for supplying said auxiliary gas to said housing and for connecting said elements to an electrical power supply.

40. Apparatus for removing combustible particles from a first gas comprising:
a housing having an inlet for the first gas and an outlet;
a plurality of filter elements for trapping combustible particles in the first gas, said elements being mounted in said housing for flow of the first gas simultaneously therethrough, each said element being made of electrically-conductive material; and
means for connecting each said element to an electrical power supply for heating said element to a temperature at which the particles trapped thereby will combust for regeneration of said element and comprising switch means for connecting said elements sequentially to a power supply.

41. Apparatus as claimed in claim 40, comprising means for supplying an auxiliary combustion gas to said housing when said filter elements are connected to the electrical power supply, said auxiliary gas supply means being arranged so that said supply of said auxiliary gas thereby will substantially prevent the first gas flowing through said filter elements and thereby substantially reduce the flow of first gas through said filter elements.

42. Apparatus as claimed in claim 41, wherein each said element is generally cylindrical and comprises an annular wall and is arranged in said housing so that the first gas will flow substantially radially inwardly through said wall thereof.

43. Apparatus as claimed in claim 42, including means closing one end of each said filter element, the other end of each said filter element being open to permit the first gas to flow from the interior thereof to the outlet of said housing, and wherein said auxiliary gas supply means comprises outlet portions which are arranged in the region of said open end of a respective filter element for directing auxiliary gas into the interior of the respective filter element.

* * * * *

UNITED STATES PATENT AND TRADEMARK OFFICE
CERTIFICATE OF CORRECTION

PATENT NO. : 4,791,785

DATED : December 20, 1988

INVENTOR(S) : John C. Hudson et al

It is certified that error appears in the above-identified patent and that said Letters Patent is hereby corrected as shown below:

Title page, item [75] should read as follows:

```
--    Inventors:   John C. Hudson, Boston;
                   Shok Thantrey, Sudbury;
                   Ian M. Jackson, Boston;
                   Berwyn C. Thomas, Boston,
                   all of England    --
```

Signed and Sealed this

Sixteenth Day of May, 1989

Attest:

DONALD J. QUIGG

Attesting Officer

Commissioner of Patents and Trademarks